United States Patent [19]

Kline, Jr. et al.

[11] Patent Number: 4,684,835
[45] Date of Patent: Aug. 4, 1987

[54] MOTOR COOLING FAN HOUSING

[75] Inventors: Leonard J. Kline, Jr., Ravenna; Thomas C. Forsyth III, Kent, both of Ohio

[73] Assignee: Ametek, Inc., Kent, Ohio

[21] Appl. No.: 785,157

[22] Filed: Oct. 7, 1985

[51] Int. Cl.⁴ .............................................. H02K 9/00
[52] U.S. Cl. .................................... 310/59; 310/40.5; 310/60 A; 310/62; 310/89
[58] Field of Search ....................... 310/89, 51, 52, 58, 310/59, 60 R, 62, 63, 60 A, 65, 40.5, 64, 40 MM; 219/369; 220/229, 231; 417/423 R; 415/185; 98/99.6, 99.8, DIG. 10

[56] References Cited

U.S. PATENT DOCUMENTS 1,739,082  12/1929  Simmons ................................ 310/62
1,797,519   3/1931  Brown .................................. 219/369
3,449,605   6/1969  Wilson ................................. 310/62
4,101,945   7/1978  Butsch .................................. 310/62

FOREIGN PATENT DOCUMENTS 3303148  8/1984  Fed. Rep. of Germany ........ 310/63
1242524  8/1971  United Kingdom .................. 310/62
1243950  8/1971  United Kingdom .................. 310/89

Primary Examiner—R. Skudy
Attorney, Agent, or Firm—Oldham, Oldham & Weber Co.

[57] ABSTRACT

A motor cooling fan housing for a by-pass vacuum motor is presented. The fan housing includes a top plate connected to a cylindrical side portion. The top plate is characterized by a plurality of uniformly spaced teardrop shaped slots therein. The slots provide for the entry of cooling air to the motor maintained therein. The slots are elongated and have a major axis which is non-collinear with the center point of the top plate of the housing.

11 Claims, 4 Drawing Figures

MOTOR COOLING FAN HOUSING

TECHNICAL FIELD

The invention herein resides in the art of dynamo-electric machines such as by-pass vacuum motors wherein separate sources of working air and motor cooling air are provided. In such devices, one fan system is typically provided to move the working air while another fan system draws ambient air over the motor for cooling the same. Particularly, the invention relates to a design for a motor cooling fan housing which provides for a significant reduction in the noise generated by the motor cooling fan.

BACKGROUND ART

By-pass vacuum motors are well known in the art. By way of example only, wet vacs are known wherein working air entrained with water is extracted from a surface. Since the working air is entrained with foreign matter such as water and dirt, a separate fan is provided for purposes of generating air flow over the motor for cooling the same. As with all vacuum motors, the operating noise levels associated therewith are becoming of increasing concern. Such noise is generally attributed to the fan tips passing by fixed elements in the fan and motor assembly. Not only is the generated noise objectionable acoustically, it also represents wasted energy. Accordingly, the modern trend is toward the reduction of noise in vacuum motors.

Previously, it has been known to maintain the motor in a housing separate from the fan assembly for drawing the working air. Maintained upon the motor housing is typically a motor cooling fan housing, receiving a fan for drawing cooling air across the motor. A typical prior art motor cooling fan housing is designated generally by the numeral 10 and shown in FIGS. 1 and 2. It will be appreciated that such a fan housing may be molded of plastic or cast of suitable metal. The fan housing 10 typically includes a top plate 12 sealing one end of a cylindrical side portion 14. This cylindrical side portion 14 would typically be open at the other end. In standard fashion, brush clip holders 16 are provided for receiving the motor brushes.

A motor cooling air fan is typically received upon the motor shaft and within the housing 10 immediately beneath the top plate 12. Motor cooling air is drawn by the fan and into the housing 10 through a plurality of segmented ring-shaped openings 18–22. In the embodiment shown, the openings 18–22 are segmented by interposed legs 24–30, generally dividing the ring-shaped openings 18–22 into four slots as shown. The legs 24–30 provide support, strength, and integrity to the top plate 12.

Using the prior art of FIGS. 1 and 2, air is drawn through the slots of the segmented rings 18–22 by a motor cooling fan and over the motor elements. Noise is inherently generated by the air being cut by the edges of the slots. Turbulence or perturbations of air flow result from the fact that the slots of the segmented rings are substantially limited to a circumferential, not radial, directioning of the air. While the fan seeks to draw the air inwardly in a vortex-shape, the slots are not so configured.

It should also be noted from FIG. 2 that the prior art motor cooling fan housing 10 has included a ring 32 extending from an outer peripheral edge thereof and into the cavity of the housing. This ring 32 is provided for purposes of strengthening the assembly and, particularly, the top plate 12. The ring 32 is also provided to shroud the cooling vent fan to prevent recirculation of the cooling air, making the fan system more efficient. The ring depth has typically been on the order of 0.2–0.3 inch, and preferably 0.25 inch. In the prior art, the ring 32 extended only shortly below the top edges of the fan blades, from a minimum of 0.060 inch to a maximum of 0.20 inch. This short extension of the ring has typically allowed a significant noise component of the motor to remain since the tip vortex shedding of air by the cooling air fan remained substantially unrestricted. Further, in the prior art the ring 32 is open at the bottom as shown in FIG. 2, providing an open void between the ring 32 and the cylindrical side portion 14, allowing turbulent air to enter and exit the void, further adding to the noise component.

Accordingly, there is needed in the art a motor cooling fan housing in which air inlets accommodate the air flow from outside the housing into the motor with reduced turbulence, perturbations, air vortex shedding, and resultant noise.

DISCLOSURE OF THE INVENTION

In light of the foregoing, it is a first aspect of the invention to provide a motor cooling fan housing having air inlets which are substantially radially directed.

Another aspect of the invention is to provide a motor cooling fan housing wherein the air inlets taper radially inwardly.

Still a further aspect of the invention is the provision of a motor cooling fan housing wherein the air inlets are angled inwardly toward the center of the top plate.

Still a further aspect of the invention is the provision of a motor cooling fan housing wherein the reinforcing ring for the top plate is of increased depth to reduce air vortex shedding by the cooling fan.

The foregoing and other aspects of the invention which will become apparent as the detailed description proceeds are achieved by a motor cooling fan housing for a motor assembly, comprising: a top plate having a center point; and a cylindrical side portion connected at one end thereof to said top plate; wherein said top plate is characterized by a plurality of tear-drop shaped openings therein.

Other aspects of the invention are attained by a motor cooling fan housing for a motor assembly, comprising: a cylindrical side portion; and a top plate connected to said side portion, said top plate having a plurality of spaced elongated openings therein, each said opening having first and second rounded ends, said first rounded ends being closer to a center point of said top plate than said second rounded ends.

DESCRIPTION OF THE DRAWINGS

For a complete understanding of the objects, techniques and structure of the invention reference should be had to the following detailed description and accompanying drawings wherein.

BEST MODE FOR CARRYING OUT THE INVENTION

Figure 2:
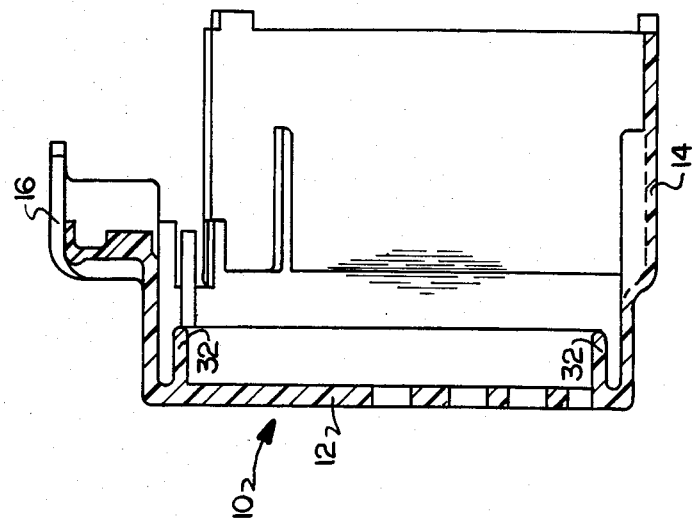
FIG. 2 is a sectional view of the housing of FIG. 1 taken along the line 2—2.
Figure 1:
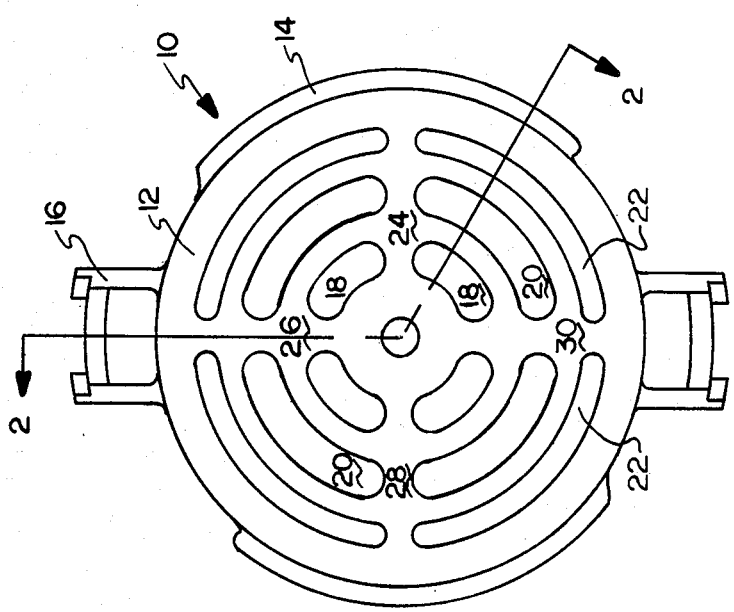
FIG. 1 is a top plan view of a prior art cooling fan housing.
Figure 4:
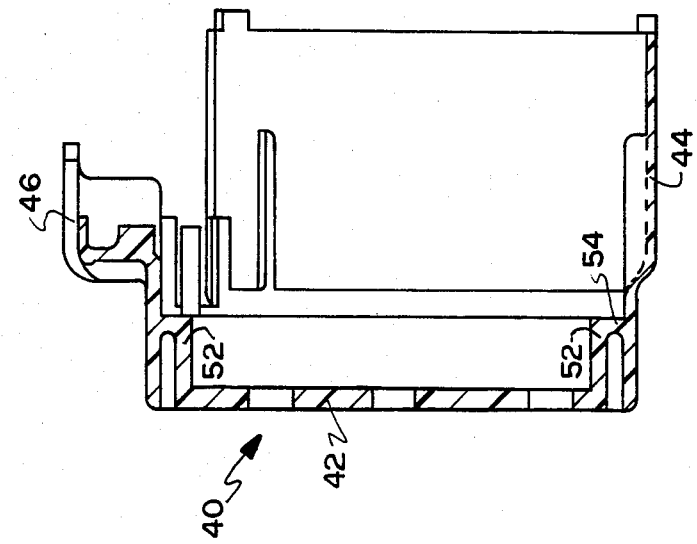
FIG. 4 is a sectional view of the housing of FIG. 3 taken along the line 4—4.
Figure 3:
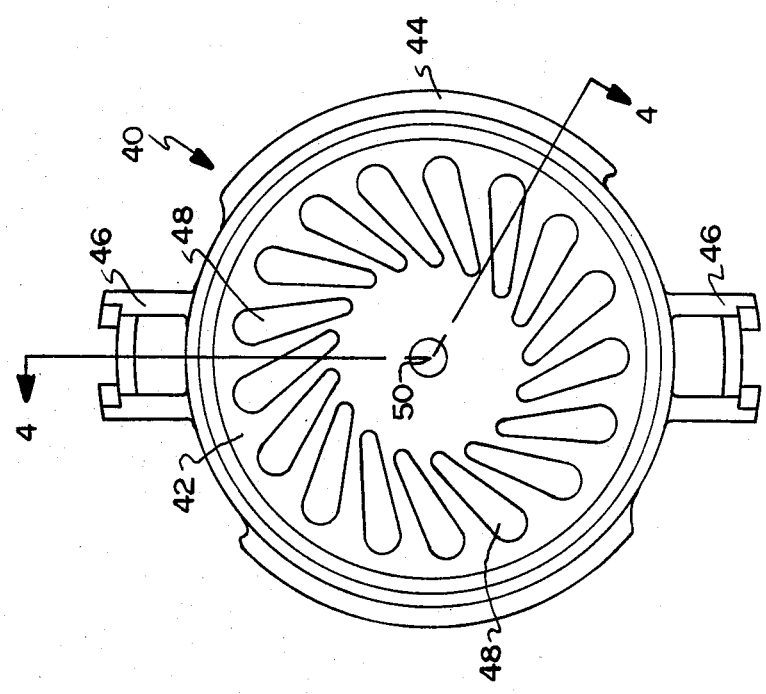
FIG. 3 is a top plan view of a motor cooling fan housing according to the invention.

With reference now to FIGS. 3 and 4, it can be seen that a motor cooling fan housing according to the invention is designated generally by the numeral 40. As with the prior art, the housing 40 may be molded of plastic or cast of suitable metal. The housing 40 includes a top plate 42 which seals one end of a cylindrical side portion 44, the other end being open. A brush clip holder 46 is provided for receiving the necessary motor brushes. Unlike the prior art structures of FIGS. 1 and 2, motor cooling air is drawn into the housing 40 through a plurality of tear-drop shaped slots 48 uniquely positioned within the top plate 42 as presented below.

The slots 48 are each of expanding size as they move in a direction generally away from the center point 50 of the top plate 42. The slots 48 are each rounded at both ends, with the ends thereof being circles of different diameters (not specifically identified in the drawings), the small circle being nearer the center point 50 than the larger outer one. As clearly shown in FIG. 3, the smaller circular ends of the slots 48 have their centers lying on a circle having as the center thereof the center point 50. Similarly, the larger circular ends of the slots 48 lie on a circle having its center at the center point 50 of the plate 42. The sides of the slots 48 are tangent to the circles forming the ends thereof as shown. It should also be noted that the larger circular ends of the slots 48 have a radius approximately twice that of the smaller circular ends.

As further shown in FIG. 3, the center points of the circular ends of each of the slots 48 are offset from each other. In other words, the center points of these circular ends are not collinear with the center point 50 of the top plate 42. The offset of the center points is an arc of 20°-30°, and preferably 24°. In other words, an angle of 24° would separate the center points of the circular ends of each slot 48, with the vertex of the angle being at the center point 50 of the plate 42.

In a preferred embodiment of the invention, the top plate 42 has a diameter of approximately 3.1 inches and receives therein 17 slots 48. The large circular ends of the slots 48, all being equidistant from the point 50, define a circle having a center point at 50 and having a diameter of 2.3 inches. In like manner, the smaller circular end slots 48 have center points which lie on a circle having a diameter of 1.2 inches and a center point at 50. The smaller circular ends of the slots 48 have a radius of approximately 0.062 inch, with the larger circular ends having a radius of 0.125 inch, substantially double that of the smaller circular ends. The plate 42 has a thickness on the order of 0.10 inch.

It should also be noted with respect to FIG. 4, that the reinforcing ring 52 extends into the cavity of the housing 40 from an outer peripheral edge of the top plate 42 a distance of 0.35-0.6 inch, and preferably 0.47 inch, nearly twice the depth of the prior art units. This extension allows the ring 52 to more significantly shroud the tips of the cooling fan, substantially eliminating tip vortex shedding of air. Depending on fan size and position, the fan tips may be totally shrouded. Further, unlike the prior art of FIGS. 1 and 2 in which the ring 32 was spaced from the cylindrical side portion 14 by a ring-like open void, the ring 52 is closed against the cylindrical side portion 44 by the ring-like plate 54, further reducing noise by preventing air entry between the ring 52 and side portion 44.

In operation, it should be understood that the motor cooling fan received within the housing 40 will rotate in a clockwise direction as viewed from the top of the unit 40 as shown in FIG. 3. With such operation, air entry into the housing 40 defines a pattern of an inverted truncated cone resting on top of the top plate 42. This air movement has been confirmed by smoke tests which monitor actual air routing. While air entry at the center of the cone is essentially vertical or normal to the top plate 42, that air more towards the periphery of the top plate 42 enters at an angle that creates the conical air column. As that peripheral entry air arrives at the outer circular end portions of the slots 48, it gathers rotational velocity due to the fan rotation preference angle of the slots. This results in reduced shear losses for the air entering the fan. Further, the air which is entering somewhat radially is not vector-impeded by the presence of the concentric rings of solid plate material as are present in the prior art between the ring segments 18-22. In other words, the instant invention provides slots which are radially as well as circumferentially directed.

It should also be appreciated that by extending the length of the reinforcing ring 52 as in FIG. 4, the tip vortex shredding of the cooling fan is significantly reduced. It has been found that such an extension of the ring 52, while maintaining the prior art plate as in FIG. 1, results in a loss of air flow for the cooling fan housing system. However, when combined with the vented plate 42 of FIG. 3, a new system is achieved which yields improved air flow and reduced noise.

Thus it can be seen that the objects of the invention have been attained by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the following claims.

What is claimed is:

1. A motor cooling fan housing for a motor assembly, comprising:
a top plate having a center point; and
a cylindrical side portion connected at one end thereof to said top plate;
wherein said top plate is characterized by a plurality of openings passing therethrough, each said opening being tear-drop shaped and characterized by first and second rounded ends, each of said first and second rounded ends of each said opening respectively defined by first and second circles tangentially interconnected by sides of said opening, each of said first and second circles having a center, the centers of said first circles being equidistant from said center point of said top plate and the centers of said second circles being equidistant from said center point of said top plate, and wherein the centers of each of said first and second circles of each of said openings are not collinear with said center point of said top plate.

2. The fan housing according to claim 1 wherein said centers of said first and second circles are separated by an angle of 20°-30°, said angle having a vertex at said center point of said top plate.

3. The fan housing according to claim 1 wherein said first circles have a smaller radius than said second circles.

4. The fan housing according to claim 3 wherein the radius of said second circle is twice that of the radius of said first circle.

5. The fan housing according to claim 1 which further includes a ring orthogonally connected to an inner surface of said top plate and extending therefrom a distance of 0.4-0.6 inch.

6. The fan housing according to claim 5 wherein said ring extends from said top plate at an outer circumferential edge thereof.

7. A motor cooling fan housing for a motor assembly, comprising:
   a cylindrical side portion;
   a top plate connected to said side portion, said top plate having a plurality of spaced elongated openings therein, each said opening having first and second rounded ends, said first rounded ends being closer to a center point of said top plate than said second rounded ends; and
   wherein said first and second rounded ends are respectively defined by first and second circles having center points which are noncollinear with said center point of said top plate, the radius of said first circles being less than the radius of said second circles.

8. The fan housing according to claim 7 wherein the center points of said first circles of said openings lie on a first common circle having a center point at said center point of said top plate and the center points of said second circles of said openings lie on a second common circle having a center point at said center point of said top plate.

9. The fan housing according to claim 8 wherein the center points of said first circles are separated from the center points of said second circles by an angle of 20°-30°, said angle having a vertex at said center point of said top plate.

10. The fan housing according to claim 7 which further includes a ring extending from an inner surface of said top plate and an outer circumferential edge of said top plate.

11. The fan housing according to claim 7 wherein said openings are uniformly spaced.

* * * * *